US009607455B2

(12) United States Patent
Parameshwaran

(10) Patent No.: US 9,607,455 B2
(45) Date of Patent: Mar. 28, 2017

(54) SYSTEM AND METHOD FOR GENERATING A DRIVING PROFILE OF A USER

(71) Applicant: Tata Consultancy Services Limited, Mumbai (IN)

(72) Inventor: Reni Parameshwaran, Kochi (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/224,001

(22) Filed: Mar. 24, 2014

(65) Prior Publication Data

US 2015/0228128 A1 Aug. 13, 2015

(30) Foreign Application Priority Data

Feb. 7, 2014 (IN) ........................... 452/MUM/2014

(51) Int. Cl.
*B60Q 1/00* (2006.01)
*G07C 5/08* (2006.01)

(52) U.S. Cl.
CPC ........... *G07C 5/085* (2013.01); *G07C 5/0808* (2013.01)

(58) Field of Classification Search
CPC ... G06Q 40/08; G06Q 10/0639; B60W 40/08; B60W 40/09; H04W 4/046; G07C 5/085; G07C 5/0808
(Continued)

(56) References Cited

U.S. PATENT DOCUMENTS 6,801,853 B2 * 10/2004 Workman ..................... 701/491
8,024,111 B1 9/2011 Meadows et al.
(Continued)

FOREIGN PATENT DOCUMENTS

EP 1537549 2/2004
EP 2306424 A1 4/2011
(Continued)

OTHER PUBLICATIONS

Moustafa Youssef, Mohamed Amir Yosef, Mohamed El-Derini "GAC: Energy-Efficient Hybrid GPS-Accelerometer-Compass GSM Localization"—arXiv:1004.3174v1 [cs.NI] Apr. 19, 2010, (6 pages).
(Continued)

*Primary Examiner* — Thomas Mullen
(74) *Attorney, Agent, or Firm* — Finnegan, Henderson, Farabow, Garrett & Dunner, L.L.P.

(57) ABSTRACT

The present disclosure generally relates to driving data monitoring, and more particularly to systems and methods for generating a driving profile of a user based on the driving data. In one embodiment, a method for generating a driving profile of a user is disclosed. The method comprises receiving one or more values corresponding to a plurality of variables. The plurality of variables are associated with driving of a vehicle. The method further comprises determining, based on the one or more values, one or more safety scores corresponding to the plurality of variables. The one or more safety scores are associated with a trip that is completed based on one or more conditions. The method further comprises determining a cumulative safety score for the trip based on the one or more safety scores and determining a driving level of the user to generate the driving profile of the user.

20 Claims, 6 Drawing Sheets

(58) Field of Classification Search
USPC .................................. 340/439; 701/1; 705/4
See application file for complete search history.

(56) References Cited

U.S. PATENT DOCUMENTS

| | | | | |
|---|---|---|---|---|
| 8,140,359 | B2 | 3/2012 | Daniel | |
| 8,271,057 | B2 | 9/2012 | Levine et al. | |
| 8,332,132 | B2 | 12/2012 | Groenhuijzen et al. | |
| 2007/0027726 | A1 | 2/2007 | Warren et al. | |
| 2010/0250021 | A1* | 9/2010 | Cook et al. | 701/1 |
| 2011/0166777 | A1 | 7/2011 | Chavakula | |
| 2011/0307188 | A1 | 12/2011 | Peng et al. | |
| 2013/0166099 | A1* | 6/2013 | Van den Bergh | 701/1 |
| 2013/0297097 | A1* | 11/2013 | Fischer et al. | 701/1 |
| 2015/0032481 | A1* | 1/2015 | Norling-Christensen et al. | 705/4 |

FOREIGN PATENT DOCUMENTS

| | | | |
|---|---|---|---|
| JP | 2002-260146 | A | 9/2002 |
| WO | WO 2013/096908 | A1 | 6/2013 |

OTHER PUBLICATIONS

Jeongyeup Paek, Joongheon Kim, Ramesh Govindan "Energy-Efficient Rate-Adaptive GPS-based Positioning for Smartphones"—*MobiSys'10*, 2010, San Francisco, California, USA. (16 pages).
Salas K Jose, X. Anitha Mary, Namitha Mathew "ARM 7 Based Accident Alert and Vehicle Tracking System"—International Journal of Innovative Technology and Exploring Engineering (IJITEE) ISSN: 2278-3075, vol. 2, Issue-4, Mar. 2013, (4 pages).
Chi Wang, Hua Liu, Bhaskar Krishnamachari, Murali Annavaram, Tsinghua University, Beijing, China, University of Southern California, Los Angeles, CA, USA, "A Privacy Mechanism for Mobile-based Urban Traffic Monitoring", available at http://ceng.usc.edu/assets/002/69518.pdf (14 pages).
Wunelli—Telematics Solutions for Motor Insurance, "SoteriaDrive—Delivering Safer Driving", www.wunelli.com/mobile-apps.aspx, 2013, (3 pages).
Discovery Insure, "Vitalitydrive", https //www.discovery.co.za/portal/individual/insure-vitality-drive-overview, 2014, (3 pages).
Aviva Drive, "How does Aviva Drive work?", http://www.aviva.co.uk/drive/, Dec. 2013, (3 pages).

* cited by examiner

SYSTEM AND METHOD FOR GENERATING A DRIVING PROFILE OF A USER

PRIORITY CLAIM

This U.S. patent application claims priority under 35 U.S.C. §119 to Indian Provisional Patent Application No. 452/MUM/2014, filed on Feb. 7, 2014. The aforementioned application is incorporated herein by reference in its entirety.

TECHNICAL FIELD

The present disclosure generally relates to driving data monitoring, and more particularly to systems and methods for generating a driving profile of a user based on the driving data obtained for a user during driving of a vehicle.

BACKGROUND

Today, assessing risk of a driver may be important. The risk assessed may depend on various factors. The factors may comprise speed of the vehicle, acceleration of the vehicle, location of the vehicle, weather, or a driving time. Also, to compute the risk associated with the driver, behaviour of the driver while driving the vehicle may need to be monitored.

The risk assessed over a significant period may be further used by insurance companies to arrive at an appropriate insurance quote for the driver, or to generate a usage-based insurance model. To compute the appropriate insurance quote, a driving profile of the driver may need to be generated. There are many products that may compute the driving profile of the driver based on the risk assessed. These products essentially evaluate the risk associated with the driver by continuously recording data associated with the above-described factors. The data may be further used to assess the risk.

Assessing the risk using the data recorded can be a computationally complex task because the amount of the data recorded may be large and the data may continuously vary. Moreover, the factors to be considered for assessing the risk may differ according to the driving conditions.

SUMMARY

This summary is provided to introduce aspects related to systems and methods for generating a driving profile of a user and the aspects are further described below in the detailed description. This summary is not intended to identify essential features of the claimed subject matter nor is it intended for use in determining or limiting the scope of the claimed subject matter.

In one embodiment, a method for generating the driving profile of the user is disclosed. The method comprises receiving one or more values corresponding to a plurality of variables. The plurality of variables are associated with driving of a vehicle. The method further comprises determining, based on the one or more values, one or more safety scores corresponding to the plurality of variables. The one or more safety scores are associated with a trip that is completed based on one or more conditions. The method further comprises determining a cumulative safety score for the trip based on the one or more safety scores and determining, based on the cumulative safety score, a driving level of the user to generate the driving profile of the user.

In one embodiment, a system for generating the driving profile of the user is disclosed. The system comprises one or more processors; and a memory storing processor-executable instructions that, when executed by the one or more processors, configure the one or more processors to: receive one or more values corresponding to a plurality of variables, wherein the plurality of variables are associated with driving of a vehicle, determine, based on the one or more values, one or more safety scores corresponding to the plurality of variables, the one or more safety scores being associated with a trip that is completed based on one or more conditions, determine a cumulative safety score for the trip based on the one or more safety scores, and determine, based on the cumulative safety score, a driving level of the user to generate the driving profile of the user.

In one embodiment, a non-transitory computer readable medium having embodied thereon computer program instructions for generating a driving profile of a user is disclosed. The computer program instructions comprise instructions for configuring a processor to perform operations comprising: receiving, by one or more hardware processors executing programmed instructions stored in a memory of an electronic device, one or more values corresponding to a plurality of variables, wherein the plurality of variables are associated with driving of a vehicle; determining, based on the one or more values, one or more safety scores corresponding to the plurality of variables, the one or more safety scores being associated with a trip that is completed based on one or more conditions; determining a cumulative safety score for the trip based on the one or more safety scores; and determining, based on the cumulative safety score, a driving level of the user to generate the driving profile of the user.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Systems and methods for generating a driving profile of a user are described. In some embodiments, one or more values corresponding to a plurality of variables are received from one or more sensors, or from third party sources in real-time. The plurality of variables may comprise acceleration, braking, cornering, speeding, a distance travelled, a distance travelled within a time interval, or a driving time.

The one or more sensors may comprise an accelerometer, a gyroscope, or a Global Positioning System (GPS) sensor.

Further, based on the one or more values, one or more safety scores may be computed for the plurality of variables. For example, the one or more safety scores may be computed for a trip completed by the user. The trip may be completed when one or more conditions are fulfilled. The one or more conditions may include, for example, a distance covered by the trip or a time taken for completing the trip is within a pre-determined range; a speed of the vehicle is less than a pre-determined threshold speed and a time for which the speed of the vehicle is less than the pre-determined threshold speed is greater than a pre-determined threshold time; the speed of the vehicle is below a pre-determined threshold speed; a distance covered by the trip is more than a pre-determined threshold distance; a time taken for completing the trip is less than a pre-determined threshold time; or a combination thereof. Subsequently, the one or more safety scores may be aggregated to determine a cumulative safety score for the trip. Further, a driving level of the user may be determined based on the cumulative safety score. The driving level of the user may represent the driving profile of the user.

While aspects of described system and method for generating a driving profile of a user may be implemented in any number of different computing systems, environments, and/or configurations, the embodiments are described in the context of the following exemplary system.

Figure 1:
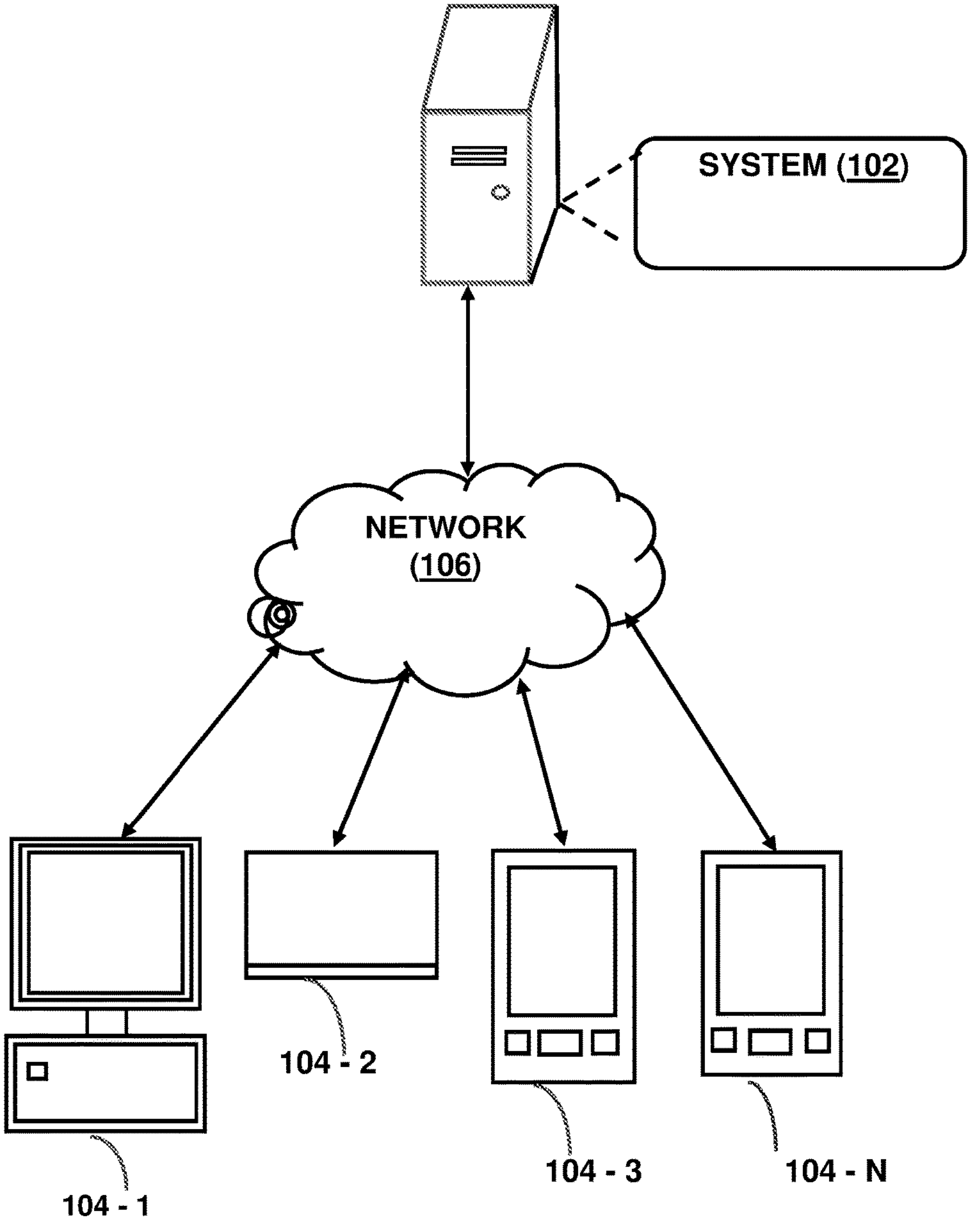
FIG. 1 illustrates an exemplary network environment including a system for generating a driving profile of a user, in accordance with an embodiment of the present disclosure.

FIG. 1 illustrates an exemplary network environment 100 including a system 102 for generating a driving profile of a user, in accordance with an embodiment of the present disclosure. In one embodiment, the system 102 may enable generating the driving profile of the user based on a driving level of the user. The driving level of the user may comprise a beginner level, an explorer level, an advanced level, or an expert level. To determine the driving level of the user, the system 102 may receive one or more values corresponding to a plurality of variables. The system 102 may further compute one or more safety scores based on the one or more values, after a trip is completed. The one or more safety scores may be further aggregated to determine a cumulative safety score for the trip. The driving level of the user may be determined based on the cumulative safety score.

Although the present disclosure is explained considering that the system 102 is implemented on a server, it is appreciated that the system 102 may also be implemented in a variety of computing systems, such as a laptop computer, a desktop computer, a notebook, a workstation, a mainframe computer, a portable electronic device and the like. In one embodiment, the system 102 may be implemented in a cloud-based environment. It is also appreciated that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 may be communicatively coupled to the system 102 through a network 106.

In one embodiment, the network 106 may be a wireless network, a wired network, or a combination thereof. The network 106 may be implemented as one of the different types of networks, such as an intranet, local area network (LAN), wide area network (WAN), the internet, etc. The network 106 may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network 106 may include a variety of network devices, including routers, bridges, servers, computing devices, storage devices, etc.

Figure 2:
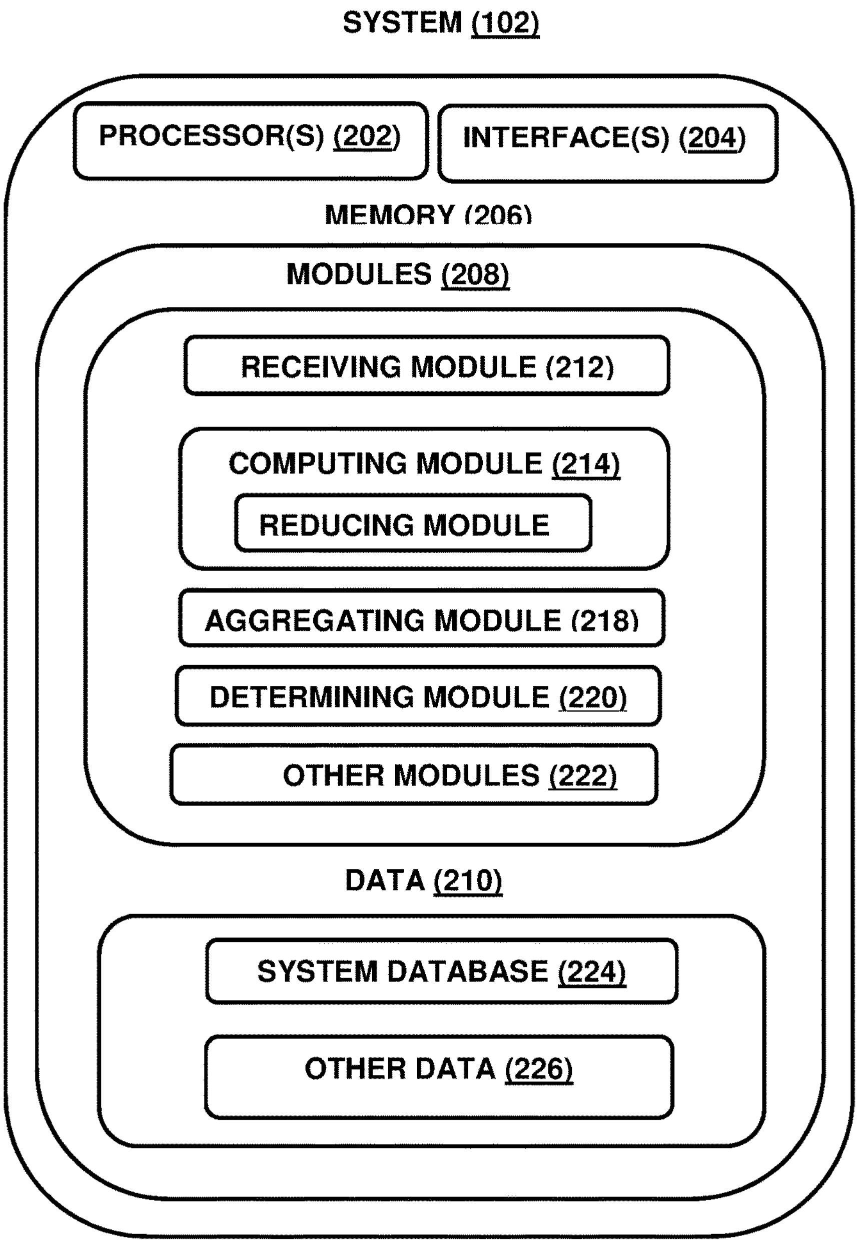
FIG. 2 illustrates an exemplary system for generating a driving profile of a user, in accordance with an embodiment of the present disclosure.

FIG. 2 illustrates an exemplary system 102 for generating a driving profile of a user, in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, etc. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks (e.g. LAN, cable networks, etc.) and wireless networks (e.g., WLAN, cellular networks, or satellite networks). The I/O interface 204 may include one or more ports for connecting a number of devices to one another or to another server.

The memory 206 may include any non-transitory computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, etc., which perform particular tasks, functions or implement particular abstract data types. In one embodiment, the modules 208 may include a receiving module 212, a computing module 214, a reducing module 216, an aggregating module 218, a determining module 220, and other modules 222. The other modules 222 may include programs or coded instructions that supplement applications and functions of the system 102.

The data 210, among other things, may serve as a repository for storing data processed, received, and generated by one or more of the modules 208. The data 210 may also include a system database 224, and other data 226. The other data 226 may include data generated as a result of the execution of one or more modules in the other modules 222.

In one embodiment, a user may use the client device 104 to access the system 102 via the I/O interface 204. The user may register using the I/O interface 204 to use the system 102. The operation of the system 102 is further described in detail in connection with FIGS. 3 and 4. The system 102 may be used for generating a driving profile of a user. To generate the driving profile of the user, the system 102 may receive one or more values corresponding to a plurality of variables. For example, the one or more values may be received by the receiving module 204.

In one embodiment, the receiving module 212 may be configured to receive the one or more values corresponding to the plurality of variables from one or more sensors, or from third party sources in real-time, or a combination thereof. The plurality of variables may be associated with driving of a vehicle. The plurality of variables may comprise at least one of: acceleration, braking, cornering, speeding, or a driving time. As an example, the one or more values may have a unit of Mph/second for a variable such as the acceleration. Similarly, the one or more values may be in terms of a speeding duration, a speed limit, and a speed of the vehicle, for a variable such as the speeding. The speed limit may be received from third party sources in real-time. Further, the speed limit may vary based on a route selected by the user. As an example, the third party sources may comprise a database providing the speed limit for the route selected by the user for driving the vehicle.

In another embodiment, the one or more values may also be received from the system database 224. For example, when the system 102 is unable to connect to the third party sources to receive the speed limit, the system 102 may receive the speed limit from data stored in the system database 224.

In some embodiments, the one or more values may be expressed in terms of a distance covered by the vehicle at night, a pre-defined time range, and a particular week day of drive, for the driving time. As an example, the one or more values may be a number of miles driven between 11:00 p.m. to 5:00 a.m. Further, the one or more sensors may comprise at least one of an accelerometer, a gyroscope, a compass, a Micro-Electro-Mechanical System (MEMS) sensor, a Global Positioning System (GPS) sensor, a Wi-Fi access point sensor, or a cell tower triangulation sensor.

In one embodiment of the system 102, the one or more sensors may be present in a portable electronic device. The portable electronic device may comprise a cellular phone, a tablet computer, a Personal Digital Assistant (PDA) device, a smart-phone, a Portable Navigation Device (PND), a wireless device, a mobile device, a handheld device, a mobile route guidance device, or a portable audio/video player, etc. The one or more sensors may record the one or more values corresponding to the plurality of variables. The one or more values recorded may be further received by the receiving module 212.

Further, the system 102 may comprise the computing module 214. Computing module 214 may be configured to compute one or more safety scores for the plurality of variables based on the one or more values. Further, the computing module 214 may comprise the reducing module 216. The reducing module 216 may be configured to reduce a pre-defined score of a variable of the plurality of variables by a factor. The factor may be determined based on the one or more values. Further, the one or more safety scores may be computed for the trip completed by the user. Completion of the trip may be based on one or more conditions. The one or more conditions may comprise, for example, a distance covered by the trip or a time taken for completing the trip is within a pre-determined range; a speed of the vehicle is less than a pre-determined threshold speed and a time for which the speed of the vehicle is less than the pre-determined threshold speed is greater than a pre-determined threshold time; the speed of the vehicle is below a pre-determined threshold speed; a distance covered by the trip is more than a pre-determined threshold distance; a time taken for completing the trip is less than a pre-determined threshold time; or a combination thereof.

As an example, when the distance exceeds 300 meters or the time exceeds 2 minutes, and when the distance is below 300 miles or the time is below 4 hours, a trip may be considered as completed. Also, the trip should have at least two location coordinates with a certain level of GPS accuracy. As another example, when the speed of the vehicle is less than 5 miles/hour for 20 minutes, the trip may be considered as completed. Further, the trip may be considered as completed when the speed of the vehicle is less than 5 miles/hour, the distance covered by the trip is less than 300 meters, the time taken for completing the trip is less than 4 hours, or a combination thereof.

In one embodiment, the one or more conditions may comprise a loss of connection of the system 102 with the vehicle for a pre-determined threshold time. As an example, the system 102 may be implemented in a portable electronic device. The portable electronic device may be connected to the vehicle through a Bluetooth device. The one or more values may be received from the one or more sensors installed in the vehicle. The portable electronic device may receive the one or more values when the Bluetooth device is connected with the portable electronic device. As a result, when the Bluetooth device of the vehicle is not connected with the portable electronic device, the trip may be considered as completed.

In another embodiment, when the system 102 is implemented in the portable electronic device, the one or more conditions may comprise low battery or unavailability of GPS signals for a pre-determined threshold time. For example, when the GPS signal may not be received by the portable electronic device for 20 minutes, the trip may be considered as completed. Further, the one or more conditions may also comprise a change of time set in the portable electronic device. For example, when the user changes the time set in the portable electronic device, the trip may be considered as completed. The data recorded by the one or more sensors until the completion of the trip may be used further to compute the one or more safety scores.

In some embodiments, the one or more safety scores for the trip may be computed when the one or more conditions are fulfilled. As a result, computational power of the processor may be saved due to the omission of unnecessary computation of the one or more safety scores.

In one embodiment, the one or more safety scores may comprise an acceleration safety score corresponding to the acceleration, a braking safety score corresponding to the braking, a speeding safety score corresponding to the speeding, a cornering safety score corresponding to the cornering and a driving time safety score corresponding to the driving time.

Figure 3:
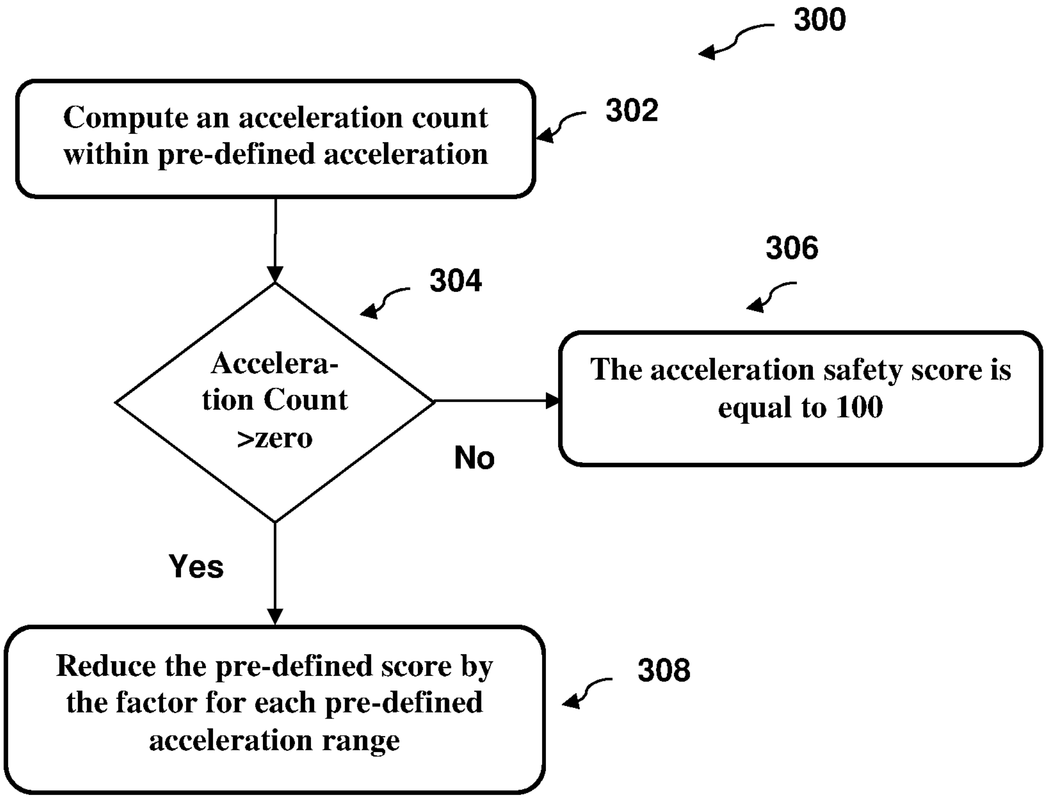
FIG. 3 illustrates an exemplary method for computing an acceleration safety score, in accordance with an exemplary embodiment of the present disclosure.

FIG. 3 illustrates an exemplary method for computing the acceleration safety score by the computing module 214, in accordance with an exemplary embodiment of the present disclosure. As an example, the pre-defined score may be considered as 100. In a first step (302), a count of acceleration events within pre-defined acceleration ranges may be computed. The count of acceleration events may be computed when or after the one or more values are recorded by the one or more sensors. For example, the pre-defined acceleration ranges may be 8.1-9.0 Mph/second, 9.1-10 Mph/second, 10.1-11.0 Mph/second, and >11.0 Mph/second. The trip may receive the acceleration safety score of 100 (step 304 and step 306) when the value for the acceleration does not fall within the pre-defined acceleration ranges. Otherwise, the pre-defined score of value 100 may be reduced by the factor (step 306 and step 308). The factor may be computed based on the count of acceleration events within the pre-defined acceleration ranges, as shown in exemplary Tables 1 and 2 below.

TABLE 1

| Pre-defined Acceleration Ranges | % Reduction in the acceleration safety score |
|---|---|
| 8.1-9.0 Mph/second | X1 % per count |
| 9.1-10 Mph/second | X2 % per count |
| 10.1-11.0 Mph/second | X3 % per count |
| >11.0 Mph/second | X4 % per count |

TABLE 2

| | X1 | X2 | X3 | X4 |
|---|---|---|---|---|
| 1 | X11 | X12 | X13 | X14 |
| >1 & = 2 | X21 | X22 | X23 | X24 |
| >2 &< = 4 | X31 | X32 | X34 | X35 |
| >4 | X41 | X42 | X43 | X44 |

Referring to the Table 1, X1, X2, X3, and X4 may represent the percentage reduction in the acceleration safety score per acceleration event in the pre-defined acceleration ranges. Further, referring to the Table 2, the factor may be computed based on the acceleration count. In some embodiments, when the count of acceleration events is one, X11, X12, X13, X14 may be equal to X1, X2, X3, and X4, respectively. When the count of acceleration events is greater than one, X21, X22, X23, and X24 (similarly, X31, X32, X33, and X34; and X41, X42, X43, and X44) may be multiplied with X1, X2, X3, and X4, respectively. Thus, the acceleration safety score may be computed by reducing the pre-defined score of 100.

In another embodiment, the acceleration safety score may be further multiplied with a plurality of factors. The plurality of factors may be computed based on weather, location, and time of the day. Optionally, the percentage reduction of the acceleration safety score may be computed for each increment in the count of acceleration events in a corresponding level.

Figure 4:
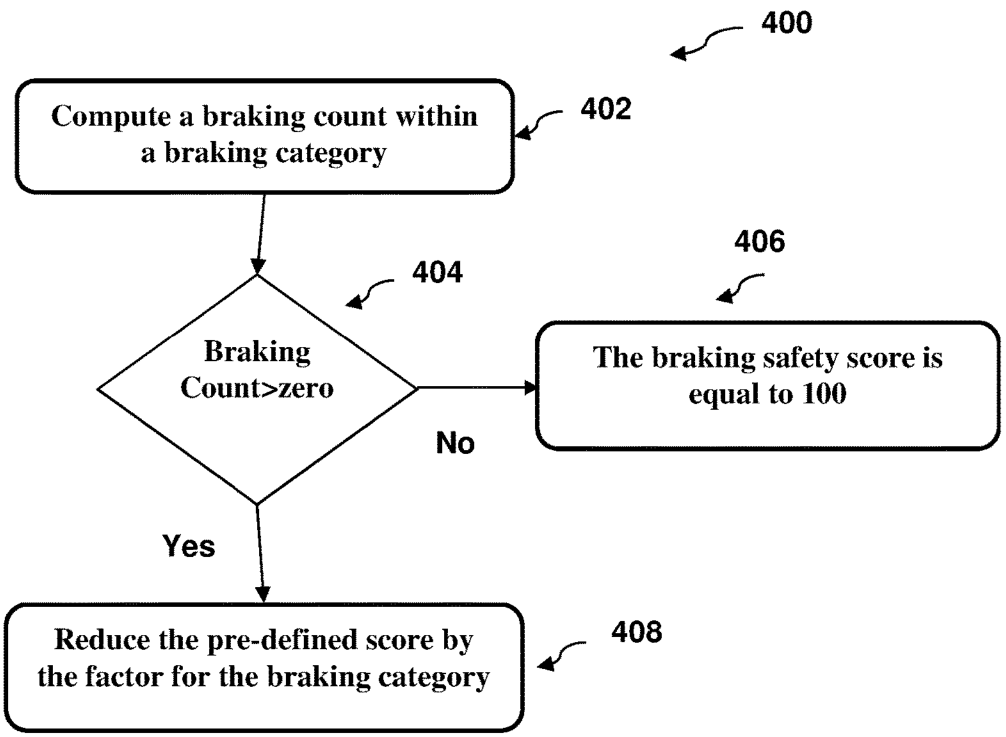
FIG. 4 illustrates an exemplary method for computing a braking safety score, in accordance with an exemplary embodiment of the present disclosure.

FIG. 4 illustrates an exemplary method for computing the braking safety score by the computing module 214, in accordance with an exemplary embodiment of the present disclosure. As an example, the pre-defined score may be 100. In a first step (402), a braking count may be computed for a number of braking events within a braking category. The braking category may be defined using pre-defined deceleration ranges. For example, the pre-defined deceleration ranges may be, −8.1∼−9.0 Mph/second, −9.1∼−10.0 Mph/second, −10.1∼−11 Mph/second, and <−11.0 Mph/second. The trip may receive the braking safety score of 100 (step 404 and step 406), when the braking count is zero within the braking category. Further, when the braking count is not zero, the pre-defined score of value 100 may be reduced by the factor (step 406 and step 408). The factor may be computed based on the braking count within the braking category, as shown in exemplary Tables 3 and 4 below.

TABLE 3

| Braking Category | % Reduction in the braking safety score |
|---|---|
| −8.1∼−9.0 Mph/second | Y1 |
| −9.1∼−10.0 Mph/second | Y2 |
| −10.1∼−11 Mph/second | Y3 |
| <−11 Mph/second | Y4 |

TABLE 4

| | Y1 | Y2 | Y3 | Y4 |
|---|---|---|---|---|
| 1 | Y11 | Y12 | Y13 | Y14 |
| >1 & = 2 | Y21 | Y22 | Y23 | Y24 |
| >2 &< = 4 | Y31 | Y32 | Y33 | Y34 |
| >4 &< = 6 | Y41 | Y42 | Y43 | Y44 |
| >6 | Y51 | Y52 | Y53 | Y54 |

Referring to Table 3, the factor for reducing the pre-defined score of 100 may be Y1, Y2, Y3, and Y4 based on the braking count within the pre-defined deceleration ranges. Further, referring to Table 4, the factor may be multiplied by one when the braking count is one. For example, Y1, Y2, Y3, Y4 may be equal to Y11, Y12, Y13, and Y14, respectively, when the braking count is equal to 1. Y21 to Y54 may represent the reduction factors for situations where the braking count is greater than 1. For example, Y21, Y22, Y23, and Y24 (or, Y31, Y32, Y33, and Y34; or Y41, Y42, Y43, and Y44; or Y51, Y52, Y53, and Y54) may be multiplied, based on the braking count for the trip, with the corresponding Y1, Y2, Y3, and Y4 when the braking count is equal to 1, respectively. Thus, the braking safety score may be computed by reducing the pre-defined score of 100.

In another embodiment, the braking safety score may be further multiplied with a plurality of factors. The plurality of factors may be computed based on weather, location, time of the day, or a combination thereof. Optionally, the percentage reduction of the braking safety score may be computed for each increment in the braking count in a corresponding level.

Further, the speeding safety score may be computed based on a speeding duration and a speeding count. To compute the speeding safety score, the speed limit of the route and the speed of the vehicle may be compared. As an example, the pre-defined score may be 100. The speeding safety score may be reduced based on the speeding duration and the speed of the vehicle above the speed limit. The factor for reducing the pre-defined score of 100 may be computed based on a percentage by which the speed of the vehicle exceeds the speed limit. The speed limit may be a maximum speed that is set for the route.

TABLE 5

| Speed limit (S is the route's speed limit) | Reduction Factor (S1 < S2 < S3 < S4) |
|---|---|
| < = S | 1 |
| >S &< = S + 10 | S1 |
| >S + 10 &< = S + 20 | S2 |
| >S + 20 &< = S + 50 | S3 |
| >S + 50 | S4 |

TABLE 6

| | <10% | >10% &< = 30% | >30 & % < = 50% | >50% |
|---|---|---|---|---|
| >S &< = S + 10 | S11 | S12 | S13 | S14 |
| >S + 10 &< = S + 20 | S21 | S22 | S23 | S23 |
| >S + 20 &< = S + 50 | S31 | S32 | S33 | S34 |
| >S + 50 | S41 | S42 | S43 | S44 |

Referring to the Table 5, in some embodiments, S+10 refers to the speed of the vehicle that is above the speed limit by 10 mph. Similarly, S+20 and S+50 refer to the speed of the vehicle that are above the speed limit by 20 mph and 50 mph, respectively. S1, S2, S3, and S4 are the factors by which the pre-defined score may be reduced for violating the S, S+10, S+20, and S+50 speed limits. Further, referring to Table 6, the factors S1, S2, S3, and S4 may be respectively multiplied with the factors (S11-S44) corresponding to the percentage of the trip during which the vehicle was driven above the S, S+10, S+20, and S+50 speed limits. For example, the factors S11 to S44 are factors having value greater than 1. The factors S11 to S44 may be multiplied with the corresponding factors S1 to S4 to compute the speeding safety score.

In another embodiment, the speeding safety score may be further multiplied with a plurality of factors. The plurality of factors may be computed based on weather, location, and time of the day. Optionally, the percentage reduction of the speeding safety score may be computed for each increment in a speeding count in a corresponding level.

Further, the cornering safety score may be computed based on a number of cornering events and a cornering level. As an example, the pre-defined score may be 100. The pre-defined score of 100 may be reduced based on the number of the cornering events. In some embodiments, when the cornering events are recorded, irrespective of the cornering level, the cornering safety score may be reduced by the factor for every cornering event. Further, as an example, the cornering level may be level 1, level 2, level 3, or level 4. Each of the cornering level may be associated with a percentage reduction value. The percentage reduction value may be the factor used for computing the cornering safety score.

TABLE 7

| Cornering Level | Reduction % (C1 < C2 < C3 < C4) |
|---|---|
| Level 1 | C1 |
| Level 2 | C2 |
| Level 3 | C3 |
| Level 4 | C4 |

TABLE 8

| | C1 | C2 | C3 | C4 |
|---|---|---|---|---|
| 1 | C11 | C12 | C13 | C13 |
| >1 &< = 3 | C21 | C22 | C23 | C24 |
| >3 &<5 | C31 | C32 | C33 | C34 |
| >5 | C41 | C42 | C43 | C44 |

Referring to Table 7, the percentage reduction values C1, C2, C3, and C4 corresponding to a single cornering event in level 1 to level 4, respectively, is disclosed. Referring to Table 8, the percentage reduction values C1, C2, C3, and C4 may be multiplied by a number greater than one for multiple cornering events. For example, C1, C2, C3, and C4 may be equal to C11, C12, C13 and C14 when the cornering event is one. C21, C22, C23, and C24 (similarly, C31, C32, C33, and C34; and C41, C42, C43, and C44) may represent weights for cornering events, and have values greater than one. C21, C22, C23, and C24 (or, C31, C32, C33, and C34; or C41, C42, C43, and C44) may be multiplied with the reduction percentage values C1, C2, C3, and C4, respectively, to reduce the pre-defined cornering score. Thus, a resulting value is the cornering safety score.

In another embodiment, the cornering safety score may be further multiplied with a plurality of factors. The plurality of factors may be computed based on weather, location, and time of the day. Optionally, the percentage reduction of the cornering safety score may be computed for each incremental increase in the cornering event in a corresponding level.

Further, the driving time safety score may be computed based on the driving time, the day of drive, and the miles driven during the night. In some embodiments, the pre-defined score may be set to 100. Further, when there are no miles driven during a pre-defined time range in the night, the driving time safety score may be 100. Further, the driving time safety score may be reduced based on the number of miles driven during the pre-defined time range. As an example, the pre-defined time range may be 11 p.m. to 5 a.m. The factor for reducing the pre-defined score of 100 may be computed based on the number of miles driven, the day of drive, and the driving time.

TABLE 9

| Miles Driven (Configurable) | % reduction (N11 < N12 < N13 < N14) |
|---|---|
| <3 | N11 |
| >3 and <10 | N12 |
| >10 and <20 | N13 |
| >20 | N14 |

TABLE 10

| Miles Driven (Configurable) | % reduction (N11 < N12 < N13 < N14) |
|---|---|
| <3 | N21 |
| >3 and <10 | N22 |
| >10 and <20 | N33 |
| >20 | N44 |

Referring to Table 9, the factor for reducing the pre-defined score of 100 for the miles driven during the pre-defined time range on a weekday is provided. Further, referring to Table 10, the factor for reducing the pre-defined score of 100 for the miles driven during the pre-defined time range on a weekend is provided. The driving time score may be further reduced by a defined value for every additional mile that is more than 20 miles.

The system 102 may further comprise the aggregating module 218. The aggregating module 218 may be configured to aggregate the one or more safety scores to determine a cumulative safety score for the trip. In one embodiment, the aggregating module 218 may be further configured to compute an average of the one or more safety scores to determine the cumulative safety score. In another embodiment, the aggregating module 218 may be further configured to compute a weighted average of the one or more safety scores to determine the cumulative safety score. The cumulative safety score may be determined on a scale of 100. The cumulative safety score may represent an overall safety of the trip corresponding to the plurality of variables.

In one embodiment of the system 102, the system may be further configured to provide driving tips and driving advice to the user based on the one or more safety scores. The driving tips based on the one or more safety scores may help the user to improve the one or more safety scores for future trips. For example, when the acceleration safety score of the user is 50, the user may be provided with a tip to reduce the speed of the vehicle to a specific value. As another example, when the braking score is low, the user may receive the driving advice regarding improvement in braking habits of the user.

In one embodiment, the driving tips and the driving advice may be displayed on the user interface of the system 102. For example, when the system 102 is implemented in a portable electronic device, the driving tips may be displayed on a screen of the portable electronic device.

As shown in FIG. 2, the system 102 may further comprise the determining module 220 configured to determine a driving level of the user based on the cumulative safety score. The driving levels may comprise a beginner level, an explorer level, an advanced level, and an expert level. The driving level of the user may represent the driving profile of the user. The user may be required to achieve a pre-defined cumulative safety score to move up to the next driving level. Each of the driving levels may have a pre-defined cumulative safety score, which the user may be required achieve to complete the driving level.

In another embodiment of the system 102, the determining module 220 may be further configured to award badges to the user. A badge may be awarded to the user when the user completes a safe trip. The safe trip may be defined based on the safety score for each variable. The threshold value for each safety score of the one or more safety scores for each variable may be pre-defined. Similarly, badges may be awarded for each safety score of the one or more safety scores. For example, an acceleration badge may be awarded if the user continuously achieves 5 consecutive safe trips. The safe trip in this case may be defined as when the value of the acceleration is not within the pre-defined acceleration ranges. Thus, for 5 consecutive trips, the value of the acceleration may not be within the pre-defined acceleration ranges. Similarly, a braking badge, a cornering badge, a speeding badge, or a safe miles badge may be awarded to the user based on the safety score for each of the plurality of variables.

In one embodiment, the user may have to achieve a pre-defined number of badges for each of the plurality of variables to improve the driving level. In another embodiment, the user may be required to achieve the pre-defined cumulative safety score along with the badges to improve the driving level.

In one embodiment of the system 102, the driving profile of the user may be used to generate an insurance quote for the user, to generate a usage-based insurance premium, or to assess risk of the user. The driving level of the user may represent a level of safety ensured by the user while driving the vehicle. The beginner level may be a lowest driving level and the expert level may be a highest driving level. An insurance company may use the driving level, the cumulative safety score, or the driving profile of the user to generate an insurance quote for the user. In another embodiment, the insurance company may generate one or more quotes for the user based on the driving level, the cumulative safety score, or the driving profile of the user. In another embodiment, the user may be provided with multiple insurance products based on cumulative safety scores for multiple trips.

Figure 5:
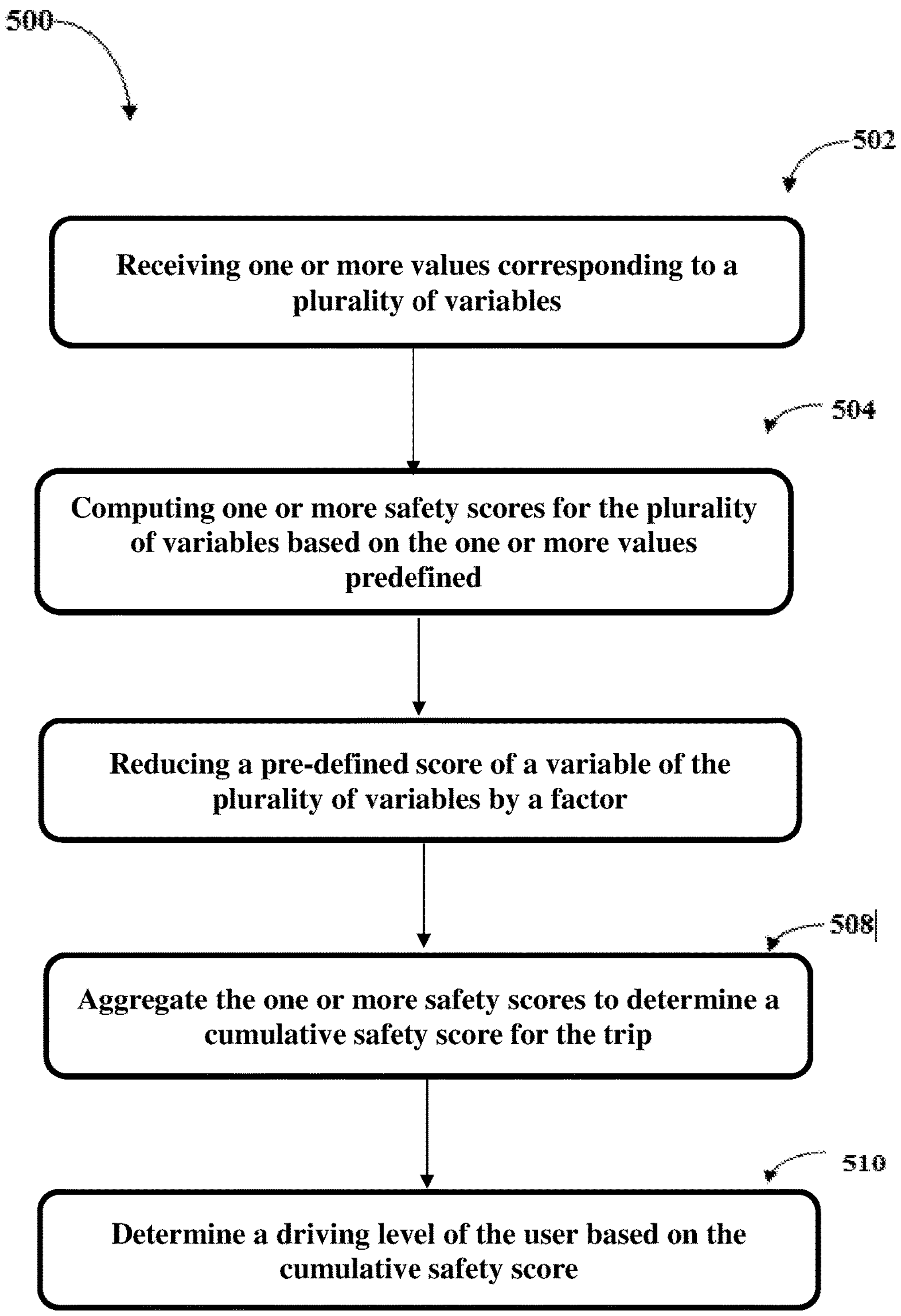
FIG. 5 illustrates an exemplary method for generating a driving profile of a user, in accordance with an embodiment of the present disclosure.
Figure 6:
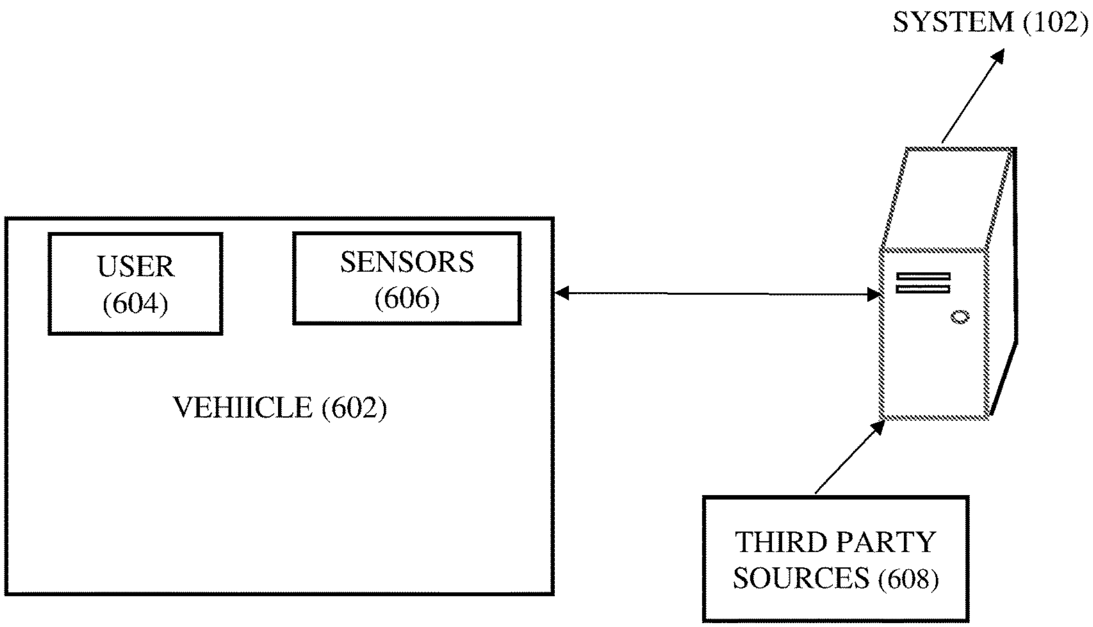
FIG. 6 illustrates a block diagram of the system of FIG. 2 connected to third party sources and a vehicle in accordance with an embodiment of the present disclosure.

FIG. 5 illustrates a method 500 for generating a driving profile of a user is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described steps can be combined in any order to implement the method 500 or alternate methods. Additionally, individual steps may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented in the above described system 102.

At step 502, one or more values corresponding to a plurality of variables may be received. In one embodiment, the one or more values may be received by the receiving module 212.

At step 504, one or more safety scores for the plurality of variables based on the one or more values may be computed. In one embodiment, the one or more safety scores for the plurality of variables may be computed by the computing module 214.

At step 506, a pre-defined score of a variable of the plurality of variables may be reduced by a factor. In one embodiment, the pre-defined score of the variable may be reduced by the reducing module 214.

At step 508, the one or more safety scores may be aggregated to determine a cumulative safety score. In one embodiment, the one or more safety scores may be aggregated by the aggregating module 216.

At step 510, a driving level of the user based on the cumulative safety score may be determined. In one embodiment, the driving level of the user may be determined by the determining module 218.

Although implementations for methods and systems for generating a driving profile of a user have been described in language specific to structural features and/or methods, it is appreciated that the appended claims are not limited to the specific features or methods described. Rather, the specific features and methods are disclosed as examples of implementations for generating a driving profile of a user.

I claim:

1. A method for generating a driving profile of a user, comprising:

receiving, by one or more processors executing programmed instructions stored in a memory of an electronic device, one or more values corresponding to a plurality of variables associated with driving of a vehicle, wherein the one or more values so received are sensed by one or more sensors or received from one or more third party sources during driving of the vehicle by the user;

determining, based on the one or more values, one or more safety scores corresponding to the plurality of variables, the one or more safety scores for a driving trip being computed after the driving trip is completed, wherein the driving trip is completed based on the fulfillment of one or more conditions associated with driving of the vehicle;

determining a cumulative safety score for the driving trip based on the one or more safety scores; and generating the driving profile of the user based on the determined cumulative safety score.

2. The method of claim 1, wherein the plurality of variables comprise two or more of: an acceleration, a braking, a cornering, a speeding, and a driving time.

3. The method of claim 1, wherein the one or more sensors are installed in at least one of the vehicle or the electronic device and the third party sources comprise one or more data sources.

4. The method of claim 3, wherein the one or more sensors comprise at least one of: an accelerometer, a gyroscope, a compass, a Micro-Electro-Mechanical System (MEMS) sensor, a Global Positioning System (GPS) sensor, a Wi-Fi access point sensor, or a cell tower triangulation sensor.

5. The method of claim 1, further comprising displaying driving tips to the user based on the one or more safety scores on a screen of the electronic device.

6. The method of claim 1, wherein determining the one or more safety scores comprises reducing a pre-defined score of a variable of the plurality of variables by a factor, wherein the factor is determined based on the one or more values.

7. The method of claim 1, wherein the one or more conditions comprise at least one of:

distance covered by the trip or a time for completing the trip is within a pre-determined range;

speed of the vehicle is less than a pre-determined threshold speed and a time for which the speed of the vehicle is less than the pre-determined threshold speed is greater than a first pre-determined threshold time;

the speed of the vehicle is less than the pre-determined threshold speed;

the distance covered by the trip is more than a pre-determined threshold distance;

the time for completing the trip is less than a second pre-determined threshold time; and GPS signals are unavailable for a third pre-determined threshold time.

8. The method of claim 1, wherein determining the cumulative safety score comprises computing an average of the one or more safety scores or a weighted average of the one or more safety scores.

9. The method of claim 1, wherein the driving profile may represent a driving level comprising a beginner level, an explorer level, an advanced level, or an expert level.

10. The method of claim 1, wherein the information obtained from the generated driving profile of the user is used to perform at least one of: generating an insurance quote for the user, generating a usage-based insurance premium, or assessing risk of the user.

11. A system for generating a driving profile of a user, the system comprising:

one or more processors; and a memory storing processor-executable instructions that, when executed by the one or more processors, configure the one or more processors to:

receive one or more values corresponding to a plurality of variables associated with driving of a vehicle, wherein the one or more values so received are sensed by one or more sensors or received from one or more third party sources during driving of the vehicle by the user, determine, based on the one or more values, one or more safety scores corresponding to the plurality of variables, the one or more safety scores for a driving trip being computed after the driving trip is completed, wherein the driving trip is completed based on the fulfillment of one or more conditions associated with driving of the vehicle, determine a cumulative safety score for the driving trip based on the one or more safety scores, and generate the driving profile of the user based on the determined cumulative safety score.

12. The system of claim 11, wherein the plurality of variables comprises two or more of: an acceleration, a braking, a cornering, a speeding, and a driving time.

13. The system of claim 11, wherein the one or more sensors are installed in at least one of the vehicle or the electronic device and the third party sources comprise one or more data sources.

14. The system of claim 13, wherein the one or more sensors comprise at least one of: an accelerometer, a gyroscope, a compass, a Micro-Electro-Mechanical System (MEMS) sensor, a Global Positioning System (GPS) sensor, a Wi-Fi access point sensor, or a cell tower triangulation sensor.

15. The system of claim 11, further comprising instructions that configure the one or more processors to display driving advice to the user based on the one or more safety scores on a screen of an electronic device.

16. The system of claim 11, wherein the one or more conditions comprise at least one of:

distance covered by the trip or a time for completing the trip is within a pre-determined range;

speed of the vehicle is less than a pre-determined threshold speed and a time for which the speed of the vehicle is less than the pre-determined threshold speed is greater than a first pre-determined threshold time;

the speed of the vehicle is less than the pre-determined threshold speed;

the distance covered by the trip is more than a pre-determined threshold distance;

the time for completing the trip is less than a second pre-determined threshold time; and GPS signals are unavailable for a third pre-determined threshold time.

17. The system of claim 11, wherein the instructions that configure the one or more processors to determine the cumulative safety score comprises instructions to compute an average of the one or more safety scores or a weighted average of the one or more safety scores.

18. The system of claim 11, wherein the driving profile may represent a driving level, comprising a beginner level, an explorer level, an advanced level, or an expert level.

19. The system of claim 11, wherein the information obtained from the generated driving profile of the user is used to perform at least one of: generating an insurance quote for the user, generating a usage-based insurance premium, or assessing risk of the user.

20. A non-transitory computer readable medium having embodied thereon a computer program for generating a driving profile of a user, the computer program comprising:

a program code for receiving one or more values corresponding to a plurality of variables associated with driving of a vehicle, wherein the one or more values so received are sensed by one or more sensors or received from one or more third party sources during driving of the vehicle by the user;

a program code for determining, based on the one or more values, one or more safety scores corresponding to the plurality of variables, the one or more safety scores for a driving trip being computed after the driving trip is completed, wherein the driving trip is completed based on the fulfillment of one or more conditions associated with driving of the vehicle;

a program code for determining a cumulative safety score for the driving trip based on the one or more safety scores;

and a program code for generating the driving profile of the user based on the determined cumulative safety score.

* * * * *